United States Patent
Banerjee et al.

(10) Patent No.: US 11,307,667 B2
(45) Date of Patent: Apr. 19, 2022

(54) SYSTEMS AND METHODS FOR FACILITATING ACCESSIBLE VIRTUAL EDUCATION

(71) Applicants: Ayan Banerjee, Tempe, AZ (US); Sandeep Gupta, Tempe, AZ (US); Prajwal Paudyal, Loveland, OH (US)

(72) Inventors: Ayan Banerjee, Tempe, AZ (US); Sandeep Gupta, Tempe, AZ (US); Prajwal Paudyal, Loveland, OH (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 55 days.

(21) Appl. No.: 16/892,248

(22) Filed: Jun. 3, 2020

(65) Prior Publication Data

US 2020/0379575 A1 Dec. 3, 2020

Related U.S. Application Data

(60) Provisional application No. 62/856,571, filed on Jun. 3, 2019.

(51) Int. Cl.
| | |
|---|---|
| G09G 5/00 | (2006.01) |
| G06F 3/01 | (2006.01) |
| G06K 9/00 | (2022.01) |
| G09B 5/14 | (2006.01) |
| G06N 3/08 | (2006.01) |
| G06K 9/62 | (2022.01) |
| G06F 17/18 | (2006.01) |
| G09B 5/06 | (2006.01) |

(52) U.S. Cl.
CPC .............. *G06F 3/017* (2013.01); *G06F 3/015* (2013.01); *G06F 17/18* (2013.01); *G06K 9/00355* (2013.01); *G06K 9/00375* (2013.01); *G06K 9/6218* (2013.01); *G06N 3/08* (2013.01); *G09B 5/067* (2013.01); *G09B 5/14* (2013.01)

(58) Field of Classification Search
USPC ....... 345/156, 173, 157, 161; 348/14.03, 77; 715/773; 455/414.1; 382/103, 203
See application file for complete search history.

(56) References Cited

U.S. PATENT DOCUMENTS

| | | | |
|---|---|---|---|
| 9,037,530 B2* | 5/2015 | Tan ...................... | A61B 5/6824 706/62 |
| 9,642,543 B2 | 5/2017 | Banerjee et al. | |
| 10,074,028 B2 | 9/2018 | Gupta et al. | |
| 10,342,447 B2 | 7/2019 | Banerjee et al. | |
| 10,575,788 B2 | 3/2020 | Gupta et al. | |
| 10,757,367 B1* | 8/2020 | Peters ................ | G06K 9/00718 |
| 10,796,246 B2 | 10/2020 | Gupta et al. | |
| 10,902,743 B2 | 1/2021 | Paudyal et al. | |

(Continued)

OTHER PUBLICATIONS

Emmorey, Language, cognition, and the brain: Insights from sign language research. Psychology Press, 2001.

(Continued)

*Primary Examiner* — Thuy N Pardo
(74) *Attorney, Agent, or Firm* — Polsinelli PC

(57) ABSTRACT

Various embodiments of systems and methods for a learning environment for accessible virtual computer science education are disclosed.

4 Claims, 15 Drawing Sheets
(11 of 15 Drawing Sheet(s) Filed in Color)

(56) References Cited

U.S. PATENT DOCUMENTS

| | | | |
|---|---|---|---|
| 2005/0271279 A1* | 12/2005 | Fujimura | G06K 9/00389 |
| | | | 382/203 |
| 2006/0253793 A1* | 11/2006 | Zhai | G06F 3/04883 |
| | | | 715/773 |
| 2012/0105613 A1* | 5/2012 | Weng | G01C 21/3664 |
| | | | 348/77 |
| 2013/0294651 A1* | 11/2013 | Zhou | G06K 9/6297 |
| | | | 382/103 |
| 2013/0317377 A1 | 11/2013 | Gupta et al. | |
| 2015/0126169 A1* | 5/2015 | Kerger | H04N 7/147 |
| | | | 455/414.1 |
| 2016/0134840 A1* | 5/2016 | McCulloch | G06K 9/00208 |
| | | | 348/14.03 |
| 2017/0220120 A1* | 8/2017 | Westbrook | G06F 3/017 |
| 2017/0374404 A1* | 12/2017 | Li | H04L 65/403 |
| 2018/0373922 A1* | 12/2018 | Yang | G06K 9/00315 |
| 2019/0052839 A1* | 2/2019 | Farrell | G06K 9/00711 |
| 2019/0056791 A1* | 2/2019 | Holz | G02B 27/0172 |
| 2019/0188587 A1 | 6/2019 | Gupta et al. | |
| 2019/0354087 A1 | 11/2019 | Gupta et al. | |
| 2019/0362562 A1* | 11/2019 | Benson | G06K 9/00671 |
| 2020/0108203 A1 | 4/2020 | Lamrani et al. | |
| 2020/0244347 A1 | 7/2020 | Banerjee et al. | |
| 2020/0293116 A1* | 9/2020 | Udall | G06F 3/167 |
| 2021/0014654 A1 | 1/2021 | Gupta et al. | |
| 2021/0165555 A1* | 6/2021 | Holz | G06F 3/012 |

OTHER PUBLICATIONS

Galliott, Military robots: Mapping the moral landscape. Routledge (2016).

Noble, The classroom arsenal: Military research, information technology and public education. Routledge (2017).

Skehan, A cognitive approach to language learning. Oxford University Press, 1998.

Walter, Deaf and hard of hearing students in transition: Demographics with an emphasis on stem education, 2010.

Alwardat, et al., Effectiveness of robot-assisted gait training on motor impairments in people with parkinson's disease: a systematic review and meta-analysis. International Journal of Rehabilitation Research 41(4), 287-296 (2018).

Anglin, et al., Visuomotor adaptation in head-mounted virtual reality versus conventional training. Scientific reports, 7:45469, 2017.

Anguera, et al., Partial sequence matching using an unbounded dynamic time warping algorithm. In Acoustics Speech and Signal Processing (ICASSP), 2010 IEEE International Conference on, pp. 3582-3585. IEEE, 2010.

Anthimopoulos, et al., Segmentation and recognition of multi-food meal images for carbohydrate counting. In: Bioinformatics and Bioengineering (BIBE), 13th International Conference on. pp. 1-4. IEEE (2013).

Banerjee, et al., Generation of movement explanations for testing gesture based co-operative learning applications. In: IEEE International Conference on Artificial Intelligence Testing, AITest 2019, Newark, CA, USA, Apr. 4-9, 2019. pp. 9-16 (2019). https://doi.org/10.1109/AITest.2019.00-15.

Braun, et al., Welcoming deaf students into stem: Recommendations for university science education. CBELife Sciences Education, 17(3):es10, 2018.

Camgoz, et al., Bosphorussign: a Turkish sign language recognition corpus in health and finance domains. In: Proceedings of the Tenth International Conference on Language Resources and Evaluation (LREC'16). pp. 1383-1388 (2016).

Camgoz, et al., Neural sign language translation. In Proceedings of the IEEE Conference on Computer Vision and Pattern Recognition, pp. 7784-7793,2018.

Chai, et al., Sign language recognition and translation with kinect. In: IEEE Conf. on AFGR. vol. 655, p. 4 (2013).

Chen, et al., Older adults' acceptance of a robot for partner dance-based exercise. PloS one 12(10), e0182736 (2017).

Chi, et al., The icap framework: Linking cognitive engagement to active learning outcomes. Educational psychologist, 49(4):219-243,2014.

Cooper, et al., Learning signs from subtitles: A weakly supervised approach to sign language recognition. In: 2009 IEEE Conference on Computer Vision and Pattern Recognition, pp. 2568-2574. IEEE (2009).

Didehbani, et al., Virtual reality social cognition training for children with high functioning autism. Computers in Human Behavior, 62:703-711, 2016.

Dowaliby, et al., A comparison of hearing-impaired and normally hearing students on locus of control, people orientation, and study habits and attitudes. American Annals of the Deaf, 128(1):53-59, 1983.

Forster, et al., Modality combination techniques for continuous sign language recognition. In: Iberian conference on pattern recognition and image analysis, pp. 89-99. Springer (2013).

Frehse, etaL, Flowpipe approximation and clustering in space-time. In: Proc. Hybrid Systems: Computation and Control (HSCC'13). pp. 203-212. ACM (2013).

Fu, et al., Tracking whole hand kinematics using extended kalman filter. In: Engineering in Medicine and Biology Society (EMBC), 2010 Annual International Conference of the IEEE. pp. 4606-4609. IEEE (2010).

Gallaudet University. Workshop for emerging deaf and hard of hearing scientists, 2012.

Garberoglio, et al., Deaf people and employment in the United States. Deaf People and Employment in the United States, Washington, DC: U.S. Department of Education, Office of Special Education Programs, National Deaf Center on Postsecondary Outcomes., 2016.

Griffin, A comparison of the cognitive styles of deaf students with the cognitive styles of hearing students. 1976.

Gupta, et a., Bluetool. In Handbook of Energy-Aware and Green Computing—Two Volumes Set., pp. 745-758. 2012.

Harih, et al., Development of a finite element digital human hand model. 7th International Conference on 3D Body Scanning Technologies (2016.

Hossain, et al., Personalized technical learning assistance for deaf and hard of hearing students. In: Thirty Fourth AAAI conference, AI4EDU workshop (2020.

IES NCES. Digest of educational statistics, 2019.

Impact lab. Learn2sign details page. Https://impact.asu.edu/projects/sign-language-recognition/learn2sign, 2018.

Jiang, et al., Human motion segmentation and recognition using machine vision for mechanical assembly operation. SpringerPlus 5(1), 1629 (2016.

Koller, et al., Deep sign: Enabling robust statistical continuous sign language recognition via hybrid cnn-hmms. International Journal of Computer Vision 126(12), 1311-1325 (2018).

Kumar, et al., Time series neural networks for real time sign language translation. In: 2018 17th IEEE International Conference on Machine Learning and Applications (ICMLA). pp. 243-248. IEEE (2018).

Lamrani, et al., Hymn: mining linear hybrid automata from input output traces of cyber-physical systems. In: IEEE Industrial Cyber-Physical Systems (ICPS). pp. 264-269. IEEE (2018).

Lightbown, et al., Focus-on-form and corrective feedback in communicative language teaching: Effects on second language learning. Studies in second language acquisition 12(4), 429-448 (1990).

Mackey, Feedback, noticing and instructed second language learning. Applied linguistics 27(3), 405-430 (2006.

Magnan, et al., Social interaction and linguistic gain during study abroad. Foreign Language Annals 40(1), 43-61 (2007).

Min, et al., Systematic review of coaching to enhance surgeons' operative performance. Surgery 158(5), 1168-1191 (2015).

Motionsavvy. Http://www.motionsavvy.com/. Accessed: Nov. 15, 2016.

Pantelidis, Reasons to use virtual reality in education and training courses and a model to determine when to use virtual reality. Themes in Science and Technology Education, 2(1-2):59-70, 2010.

(56) References Cited

OTHER PUBLICATIONS

Papandreou, et al., Towards accurate multi-person pose estimation in the wild. In: CVPR. vol. 3, p. 6 (2017).
Passig, et al., Enhancing the induction skill of deaf and hard-of-hearing children with virtual reality technology. Journal of Deaf Studies and Deaf Education, 5(3):277-285, 2000.
Paudyal, et al., "A Comparison of Techniques for Sign Language Alphabet Recognition Using Armband Wearables", ACM Transactions on Interactive Intelligent Systems, Mar. 2019, vol. 9, No. 2-3, Article 14, 26 pages <DOI:10.1145/3150974>.
Paudyal, et al., "Learn2Sign: Explainable AI for sign language learning", 2019 Joint ACM IUI Workshops (Mar. 20, 2019, Los Angeles, USA), 2019, vol. 2327, 7 pages.
Paudyal, et al., (accepted) a comparison of techniques for sign language alphabet recognition using arm-band wearables. ACM Transactions on Interactive Intelligent Systems (TiiS), 2018.
Paudyal, et al., Dyfav: Dynamic feature selection and voting for real-time recognition of fingerspelled alphabet using wearables. In: Proceedings of the 22nd International Conference on Intelligent User Interfaces, pp. 457-467. ACM (2017).
Paudyal, et al., Learn2sign: Explainable ai for sign language learning. In: Proceedings of the 24nd International Conference on Intelligent User Interfaces. pp. 457-467. ACM (2019).
Paudyal, et al., Sceptre: a pervasive, non-invasive, and programmable gesture recognition technology. In Proceedings of the 21st International Conference on Intelligent User Interfaces, pp. 282-293. ACM, 2016.
Pavlik, et al., Using a model to compute the optimal schedule of practice. Journal of Experimental Psychology: Applied, 14(2): 101, 2008.
Riley, et al., Coaching: An approach to efficiently and intuitively create humanoid robot behaviors. In: Humanoid Robots, 2006 6th IEEE-RAS International Conference on. pp. 567-574. IEEE (2006).
Rosen, American sign language curricula: A review. Sign Language Studies, 10(3), 2010.
Rosetta Stone. Talking back required, https://www.rosettastone.com/speech-recognition, 2016. [Online; accessed Sep. 28, 2018].
Salichs, et al., Study of scenarios and technical requirements of a social assistive robot for alzheimer's disease patients and their caregivers. International Journal of Social Robotics 8(1), 85-102 (2016).
Sarafianos, et al., 3d human pose estimation: A review of the literature and analysis of covariates. Computer Vision and Image Understanding 152, 1-20 (2016).
Schmidt, et al., Using viseme recognition to improve a sign language translation system. In: International Workshop on Spoken Language Translation, pp. 197-203 (2013).
Sharkey, The evitability of autonomous robot warfare. International Review of the Red Cross 94(886), 787-799 (2012).
Shema, et al., Virtual reality training to enhance behavior and cognitive function among children with attention-deficit/hyperactivity disorder: brief report. Developmental neurorehabilitation, pp. 1-6, 2018.
Spaepen, et al., Number without a language model. Proceedings of the National Academy of Sciences, 108(8):3163-3168, 2011.
Stillfried, et al., MRI-Based Skeletal Hand Movement Model, pp. 49-75. Springer International Publishing, Cham (2014).
Stokoe, Sign language structure: An outline of the visual communication systems of the American deaf. Journal of deaf studies and deaf education, 10(1):3-37, 2005.
Szegedy, et al., Rethinking the inception architecture for computer vision. In: Proceedings of the IEEE conference on computer vision and pattern recognition, pp. 2818-2826 (2016).
Tome, et al., Lifting from the deep: Convolutional 3d pose estimation from a single image. CVPR 2017 Proceedings pp. 2500-2509 (2017).
Tompson, et al., Joint training of a convolutional network and a graphical model for human pose estimation. In: Advances in neural information processing systems, pp. 1799-1807 (2014).
US Department of Education. Status and trends in the education of racial and ethnic groups 2016, 2017.
Van der Kleij, et al., Effects of feedback in a computer-based learning environment on students learning outcomes: A meta-analysis. Review of educational research, 85(4):475-511, 2015.
Vesselinov, et al., Duolingo effectiveness study. City University of New York, USA 28 (2012).
Viswanathan, et al., Using the tablet gestures and speech of pairs of students to classify their collaboration. Transactions on Learning Technologies, 11(2):230-242, 2018.
Yau, et al.,Smart classroom: Enhancing collaborative learning using pervasive computing technology. ASEE, 2003.
Zhang, et al., Myosign: enabling end-to-end sign language recognition with wearables. In: Proceedings of the 24th International Conference on Intelligent User Interfaces, pp. 650-660. ACM (2019).
Zhao, On automatic assessment of rehabilitation exercises with realtime feedback. In: 2016 IEEE International Conference on Electro Information Technology (EIT). pp. 0376-0381. IEEE (2016).

* cited by examiner

Config 3: In class collaboration with DHH or Hearing Peers

Config 4: Interpreter, Slides, Laptop

Config 5: Collaboration with a peer outside classroom

SYSTEMS AND METHODS FOR FACILITATING ACCESSIBLE VIRTUAL EDUCATION

FIELD

The present disclosure generally relates to accessibility in learning environments, and in particular, to a system and associated method for facilitating accessible virtual education in the form of a gesture-matching model to enable gesture-based learning and communication in a learning environment.

BACKGROUND

Advances in machine learning, artificial intelligence (AI) and embedded computing is revolutionizing human computer communication, where humans and computers will operate in symbiosis for collaborative outcomes and cooperative learning. The applications with collaboration can span over robot assisted military combat, and collaborative rehabilitation for diseases such as Parkinson's or Alzheimer's. Cooperative learning applications include computer aided training of military personnel, heavy equipment operators, or performance coaching in entertainment applications or tutoring American Sign Language (ASL) for ease of communication between humans with various disability profiles such as deaf or hard-of-hearing (DHH). In addition, distance learning options are becoming increasingly necessary. Thus, a need exists for accessible distance-learning options for DHH students and learners of gesture-based tasks.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1:
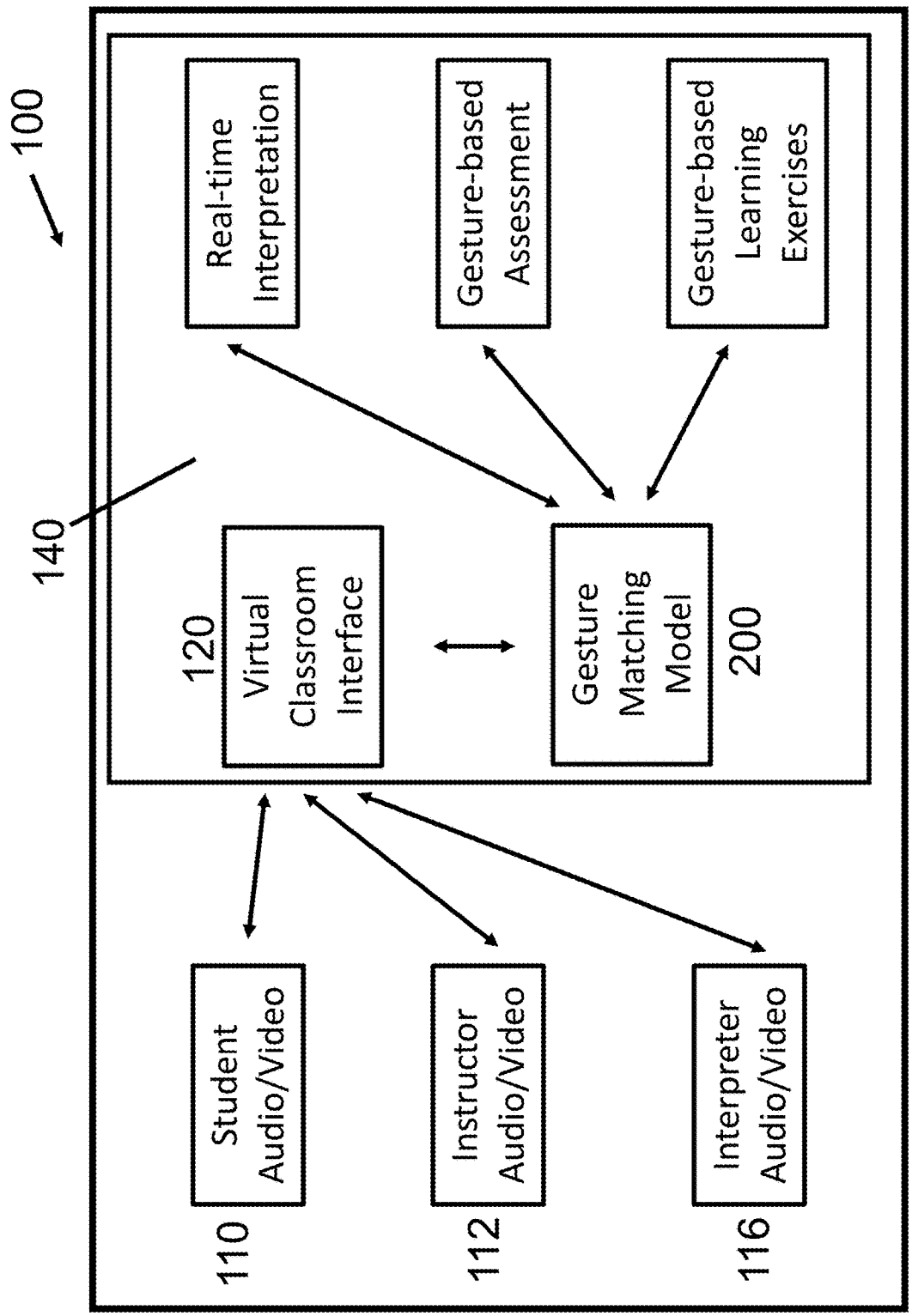
FIG. 1 is a system diagram showing a system for a gesture-enabled learning environment.

Various embodiments of a system and associated methods for a gesture-enabled learning environment are disclosed herein. In one aspect, the gesture-enabled learning environment includes a gesture-matching model which can monitor and provide direct feedback to a learner of gesture-related tasks by comparing gestures performed by a learner with that of a model tutor. The gesture-matching model is scalable and adaptable to a variety of gesture styles and can be instantiated within the system to provide direct tutor feedback, assessments, and automated translation services within the learning environment. The gesture-enabled learning environment also incorporates virtual reality to provide an accessible distance learning environment.

In some embodiments of the learning environment, instructors, students and/or interpreters can access the learning environment online thorough virtual reality or conventional systems and participate in a lesson. In some embodiments of the learning environment, the gesture-matching model can be instantiated in the form of an AI enabled tutor where students can interact with the tutor to learn gesture-based tasks. This aspect can be utilized in applications involving teaching proper execution of gesture-based tasks such as but not limited to sign languages and handwashing techniques.

In another aspect of the learning environment, the gesture-matching model can be used to instruct teachers, interpreters and/or students on gesture-based vocabulary related to the learning material (i.e. educating interpreters and students on technical terms previously unknown to deaf or hard-of-hearing (DHH) individuals). In this manner, the learning environment can be made accessible to DHH students in physical or online classes by enabling a remote tutor to physically observe and more effectively translate class communication including lectures and conversation with other students and the instructor. In addition, the gesture-matching model can be used to automatically recognize signs performed by interpreters and students for translation between sign language and text/audio. Referring to the drawings, embodiments of a gesture-enabled learning environment system are illustrated and generally indicated as 100 in FIGS. 1-9.

Referring to FIG. 1, a gesture-enabled learning environment system 100 is shown which incorporates data from one or more student audio/video setups 110, an instructor audio/video setup 112, and optionally, an interpreter audio/video setup 114 to provide an accessible gesture-based learning environment 100 (hereinafter referred to as "system") for students. The audio/video data may be captured and communicated to a virtual classroom interface 120 hosted on a server 140 using personal computing devices. In some embodiments, the students, instructor, and/or interpreter can view the virtual classroom interface 120 through virtual reality devices, personal computers, and/or mobile devices. The learning environment system 100 further includes a gesture matching model 200 in communication with the virtual classroom interface 120 for practice and assessment of gesture-based tasks and accessibility related items such as real-time interpretation and gesture-based vocabulary instruction for teachers, students, and interpreters.

Gesture-Matching Model

In many applications, gestures form an important component of communication between the human and the computer or another human. A gesture can be broken down into multiple components arranged in temporal order with specific transitions from one component to the other.

In some embodiments of the learning environment system 100, the co-operative gesture matching model 200 is incorporated for teaching gesture-based tasks, as well as translating new vocabulary concepts into gestures. The model 200 not only recognizes errors in a gesture language learner, but also provides corrective feedback that enables the learner to replicate a gesture with similar qualities of a human tutor.

Figure 2:
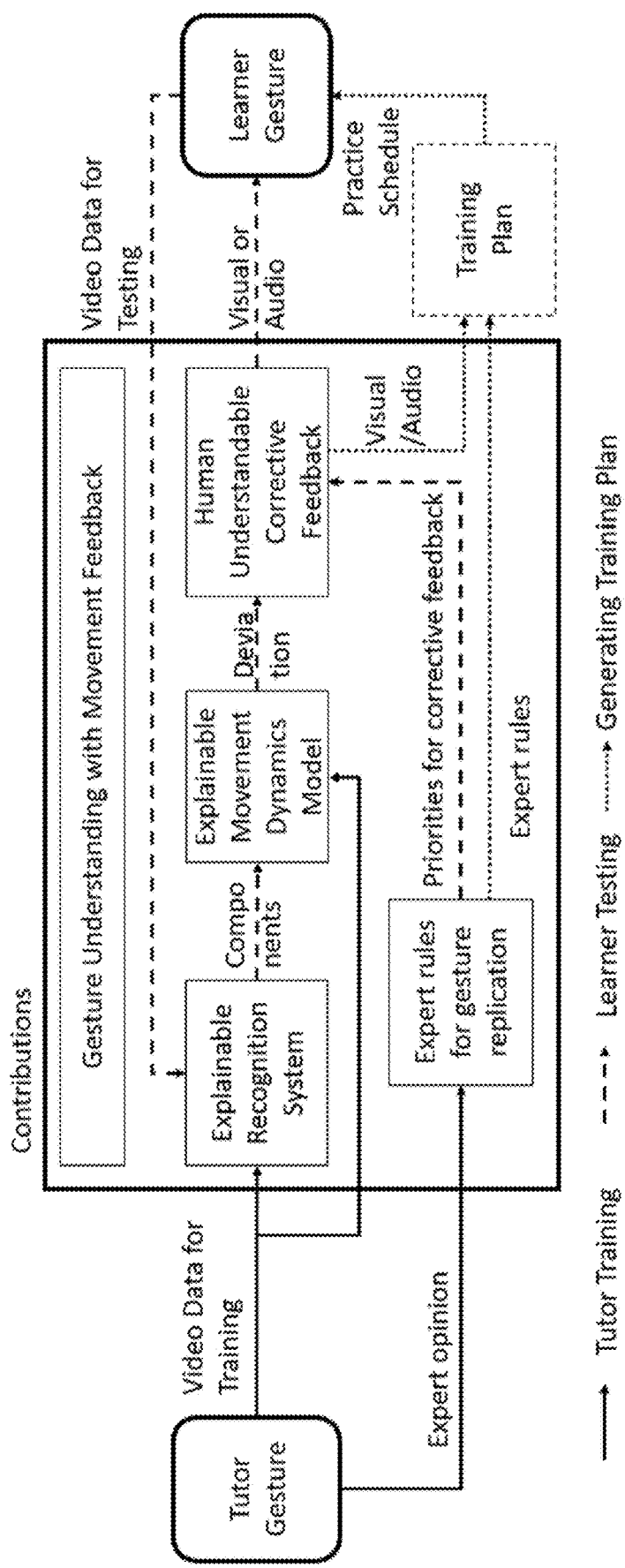
FIG. 2 is a diagram showing a gesture matching model for use with the system of FIG. 1.

The gesture matching model 200 shown in FIG. 2 takes multiple recitations of a given gesture from several human tutors. The gesture matching model 200 should model not only individual gesture components using a data-driven machine learning architecture, but should also model the transition from one component to the other. In addition, the human tutors will also provide "expert rules" that are essential for expressing a correct or nuanced meaning of a gesture and can be used to guide corrective feedback to the learner. In the testing phase, a learner provides sensor data for a replication of the gesture, which is passed to a recognition system. It results in recognition of the gesture components along with an explanation for correctness. The inter-component movement will be checked against a tutor using a movement dynamics model. The results from the component and movement recognition system will be combined with expert rules to create a prioritized set of corrective feedback for the learner using a corrective feedback mechanism, which will be disseminated through audio-visual means. In an extension of this system, it can also be envisioned that the system generates a personalized training plan for the learner over time. The training plan is considered as an extension for research.

Embedding Movement in Models

Hybrid systems encode transient behavior using a set of differential equations that can be used to represent the kinematics of the gesture. For example, the transient behavior of the movement from one hand shape to other is captured from high definition video and Posenet is used to estimate wrist positions. A kinematic model obtained from expert knowledge of human hand movements can express the transient dynamics of movement in between hand shapes. The recognition result of the recognition system can then be represented as discrete states while the learned kinematic model can be considered as the dynamical component of the hybrid system representation of the gesture. State transitions can be expressed through temporal constraints.

Figure 3B:
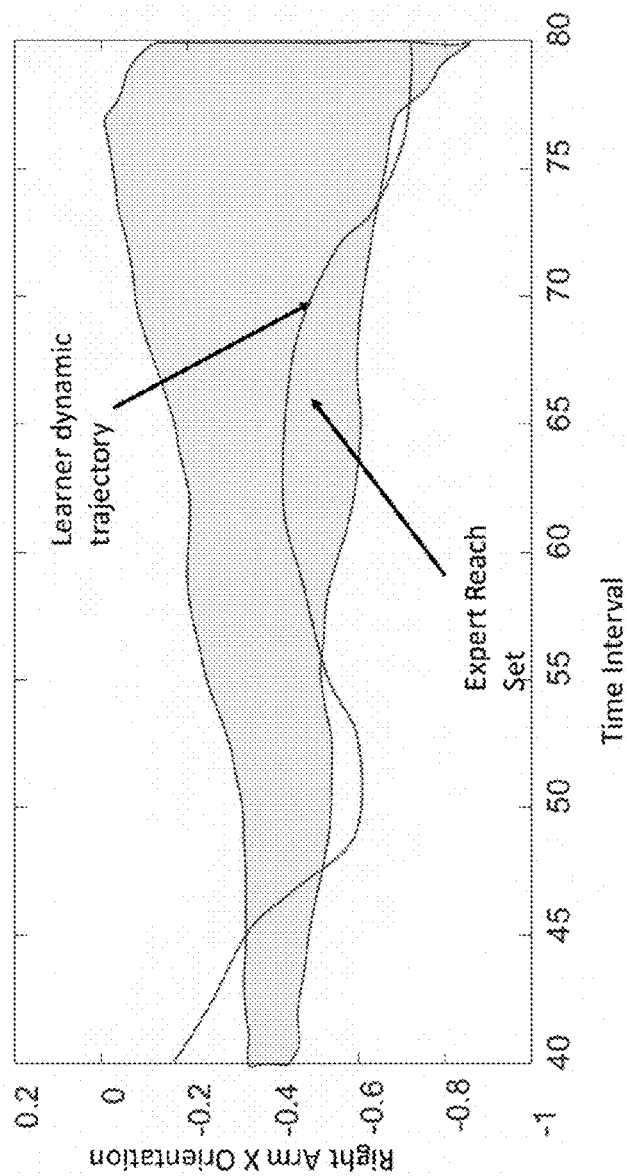
FIG. 3B is a graphical representation showing an X-orientation reach set evolution for execution of the gesture of FIG. 3A by human tutors compared with a learner's execution of the gesture, as performed by the model of FIG. 2 for the system of FIG. 1.
Figure 3A:
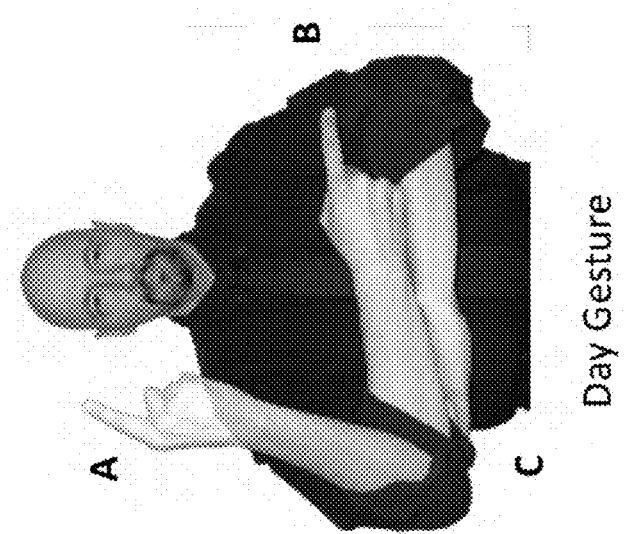
FIG. 3A is a photograph of a subject performing a gesture.
Figure 4:
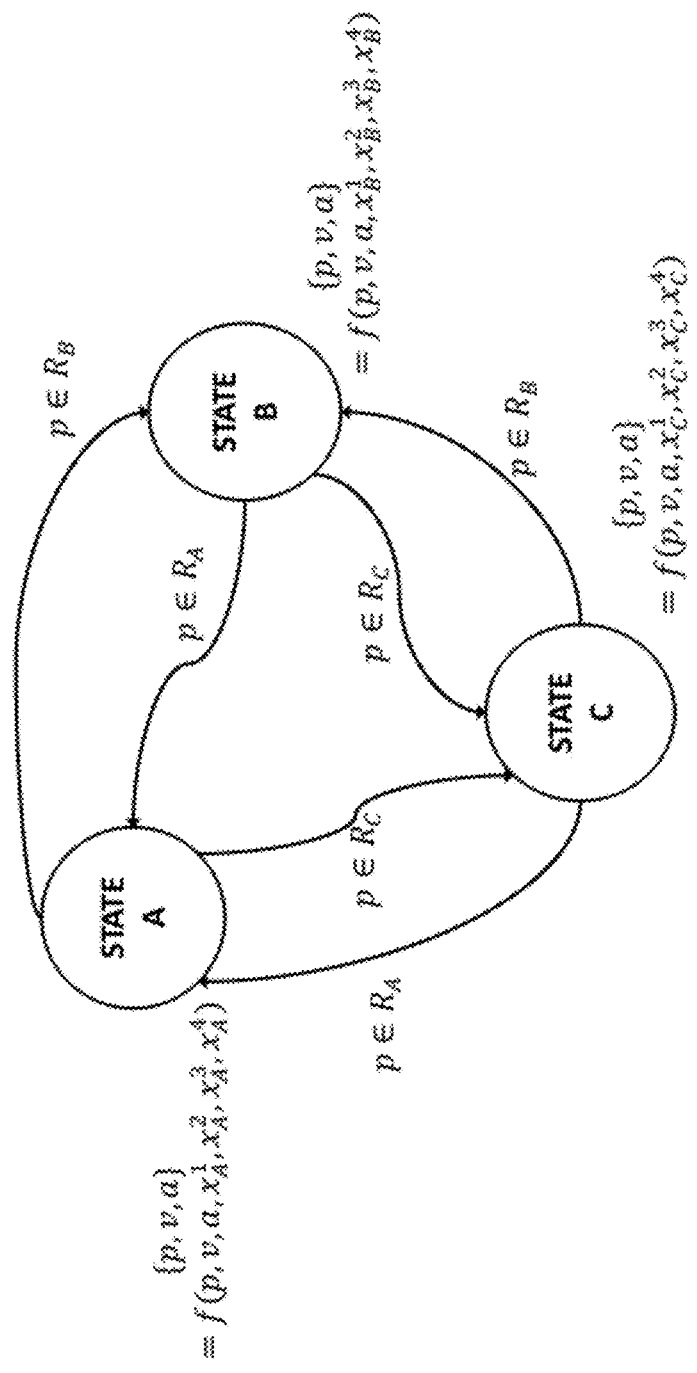
FIG. 4 is a graphical representation showing calculation of state changes for the execution of the gesture of FIG. 3A.

Proof-of-concept example: Consider the gesture for "Day" in American Sign Language (ASL). The Day gesture is shown in FIG. 3A, involving two hand shapes: a) the left hand pointing towards the right, and b) the right hand pointing towards the head. Then, the gesture has one transient hand movement, where the right arm while pointing pivots on the right elbow and makes a quarter circle and lands on the left elbow. A hybrid system representing three gesture states for the gesture of FIG. 3A was generated for the Day gesture, as shown in FIG. 4. The gesture matching model 200 considers three different components, or states, of the "Day" gesture: a) Pointing to the head (State A), b) movement from head to the top of the left arm (State B), and c) movement from top of the left arm to the elbow (State C). While transitioning from one state to the other, it is consider that the center point of the palm of both the left and right arm move following the model described in Equation 1

$$\frac{d\vec{p}}{dt} = \vec{v}, \frac{d\vec{v}}{dt} = \vec{a}, \frac{d\vec{a}}{dt} = x_1\vec{a} + x_2\vec{v} + x_3\vec{p} + x_4, \qquad (1)$$

where $\vec{p}$ is the position vector for the right arm, $\vec{u}$ is the velocity vector and $\vec{a}$ is the acceleration vector and $x_1 \ldots x_4$ are parameters of the hand motion. This is an overly simplistic model of palm movement, however it is used to generate useful feedback relating to arm acceleration.

Ubiquitous Recognition of Movement

The need for recognition of concepts from data collected using heterogeneous sensors prohibits the usage of traditional machine learning systems, which are affected by camera resolution, lighting condition, as well as distance from the lens. Although Convolutional Neural Networks (CNN) or other deep learning systems can perform object recognition under noisy conditions, concepts in a gesture video include much finer details such as handshapes, fine grained location information, and movements, which may not be recognized effectively by a deep learning system. Moreover, the amount of available training data for gesture recognition is far less than what needed for reliable performance of deep learning classification systems avoiding the risk of over-fitting.

In contrast, a different approach is taken through pose estimation. The system 100 converts the gesture execution into spatio-temporal evolution of continuous variables. The recognition is a composite outcome of simpler similarity-based comparisons. This contributes to the robustness to changing environmental conditions, as since the pose estimation step already eliminates background and only focuses on points of interest.

An "X" and "Y" coordinate time series is generated representing position of the right and left wrists normalized with respect to torso height and hip width. The location concept was extracted using six location buckets around the face and the chest of a user. This is because as a concept only the proximity to different body parts are important and not the exact pixel level location.

To extract a hand shape, wrist points were used to crop the palm of the user. A CNN Inception model was trained using the ImageNet dataset and retrained using fingerspelling hand shapes. The retrained inception model was not used to classify hand shapes, but instead was used to compare two hand shapes: one hand shape from a tutorial video (featuring the human tutor) and the other hand shape from the learner. Only the outputs of the penultimate layer of the CNN Inception model for both the tutorial and the user was compared using a Euclidean distance metric. This not only enables concept-matching but also provides extensibility, as no additional training is required to compare new tutorial signs.

Various methods of movement concept recognition were explored including comparison with respect to kinematic model parameters and direct comparison using segmental dynamic time warping strategy. Segmental dynamic time warping is model-agnostic and only gives feedback about the correctness of the movement concept. The method of comparison with respect to kinematic model parameters, however, utilizes a hybrid dynamical system to model gesture concepts. This model-driven approach can provide more granular feedback.

Movement Matching Between Tutor and Learner

The hybrid dynamical system-based representation of a gesture was instantiated for a human tutor. The instantiation procedure involved collecting data using wearable and video based sensors from the human tutor and running the following hybrid dynamical system mining methodology:

Hybrid Mining Technique: The input to the hybrid dynamical system mining methodology are input-output traces, which may include timed events and discrete or continuous inputs. Given an execution of the gesture by a learner, the gesture matching model 200 provides executed hand shapes, the times of transition from one shape to the other, and an identification of wrong executions by the learner. The reach set comparison can provide the deviation from a human tutor. For instance if the fingertip data is encompassed by the reach set then, it is tutor level. However, if it is outside the reach set at any point in time, then the gesture matching model 200 determines the learner has differences with the human tutor. The time segments where the learner differed from the human tutor can then be passed to a dynamical system mining technique that is programmed with the kinematic model of the human arm. The mining technique will provide a new set of parameters for the learner.

A) I/O segmentation. The discrete mode changes of the hybrid model is triggered by three main causes: a) user generated external events that are accompanied by time stamps and input configurations, b) system generated timed events, and c) events generated due to threshold crossing of observable parameters of the physical system.

B) Cluster modes in accordance with their triggering mechanism. This clustering step is required to minimize the redundancy in the number of discrete modes of the mined specification C) Mining the kinematic equations. Each trace is passed to a Multi-variate Polynomial Regression model to obtain the kinematic equations. For the linear case, the linear coefficients are computed using Fischer information and Cramer Rao bound. The output is the flow equation parameters for each trace between modes. A result of the flow equation extraction mechanism is that different traces may have the same flow equation. The corresponding modes are then clustered together using density based approaches on the flow parameters and assigned the same mode labels.

D) Guard mining. Guard conditions are derived for each cluster, where each cluster represents a distinct control switch. If the guard condition is not a constant value of actuation and is varying within each data point in the cluster, Fisher information and Cramer Rao bound are employed to derive the linear relation of the input, output, and internal parameters. The Guard conditions are then used to further refine the mode clustering. The output is a Hybrid automata inferred from the input, output, and internal parameters with modes, flow equations, and guards.

Tutor and Learner Comparison: The natural variation of a human tutor is modeled by computing a reach set of the learned hybrid system. The reach set is the set of all continuous states that is observed from simulating the hybrid system over time for a bounded set of initial conditions, which may represent natural variations in the human tutor's execution of the gesture.

Proof-of-concept: Kinect data including video and bone movement data was collected from 60 subjects for 20 ASL gestures including "Day". A sign language lecturer at Arizona State University was selected to be a human tutor. Data was collected for 20 executions of "Day" and the variations in initial positions and angles, speeds, and the parameters of Equation 1 were all computed. The sensors used were Kinect video and bone data. In addition the tutors wore an armband that collected accelerometer, orientation, gyroscopic and electromyogram data. The traces were used to derive the parameters of the kinematics described in Equation 1.

Different initial conditions were then derived by performing a statistical analysis of the tutor's speed, initial positions and parameters for Equation 1. These were used to perform the reachability analysis of the hybrid system using the SpaceEx tool. FIG. 3B shows the X orientation reach set evolution of the hybrid system. All the different executions of the tutor are inside the gray area. The reach set is an over approximation because exact computing is intractable Another subject's execution of the "Day" gesture was then considered, where the learner ended the Day gesture with the right palm near the left. The X orientation of the right palm of the learner is shown in red in FIG. 3B. As shown, the learner violates the reach set and hence is not classified as similar enough to the tutor, although all the hand signs are correctly executed by the learner. However, the learner executes the same sequence of hand shapes. Hence, a knowledge based feedback system will consider this execution as correct. But the execution has clear differences with the tutor in the transition between gestures in the transition from state B to C.

The dynamics of the learner's execution between state B and C is then used to regenerate the parameters of Equation 1. The learner is seen to have 40% elevated $x_3$. This means that as the position of the right arm goes closer to the left arm, the acceleration increases resulting in overshooting of the right arm beyond the left arm position. Hence, the feedback that is generated for the learner is to control the learner's right arm so that the velocity is uniform. By practicing, one can achieve the right arm velocity uniformity and be on par with the tutor.

Explainable Feedback

A variety of feedback could be constructed using the information available from the results of the location, movement, and handshape modules. In addition to separate feedback for each of the hands, feedback could also be presented in forms of annotated images or by using animations. For location feedback, the correct and the incorrect locations for each of the hands could be highlighted in different colors. For the handshape feedback, the image of the hand that resulted in the highest difference in similarity could be presented. Each of these types of possible feedback is derived from the information available. However, they should be individually tested for usability and care should be taken not to cognitively overload the learner with too much feedback at once.

More granular feedback can be provided using kinematic models if each component of the model has direct correlation with a physical manifestation of the human arm. Such correlations and the parameters estimated for the learner can be used to generate understandable feedback that enables the learner to perfect gesture execution. Such feedback will be guided by the expert rules specified by the tutor. Complex models tend to be less amenable towards feedback generation. Hence the goal will be to best exploit the trade-off between model complexity and explainability.

Virtual Classroom

Accessible Virtual Education

In some embodiments, the system 100 can aid DHH individuals and Interpreters in developing a standard set of gestures for technical terms to be used in class discussion through crowdsourcing and learn new technical gestures through automated feedback. Further, in some embodiments, the system 100 can provide gesture-based exercises, instruction and assessments for both hearing and DHH students for learning gesture-based tasks. In another aspect, the system 100 provides a virtual reality (VR) interface to provide an in class experience for students in online courses and a collaborative space to enable DHH-to-DHH (deaf and hard-of-hearing) and DHH-to-hearing interaction. Envisioned architecture

TABLE 1

Components per user type

| Students | Instructor | Interpreter |
|---|---|---|
| VR Headset | VR Headset | VR Headset |
| Laptop | AV Recording System | AV Recording System |
| Webcam | VR Projectoion System | Laptop |

Figure 5A:
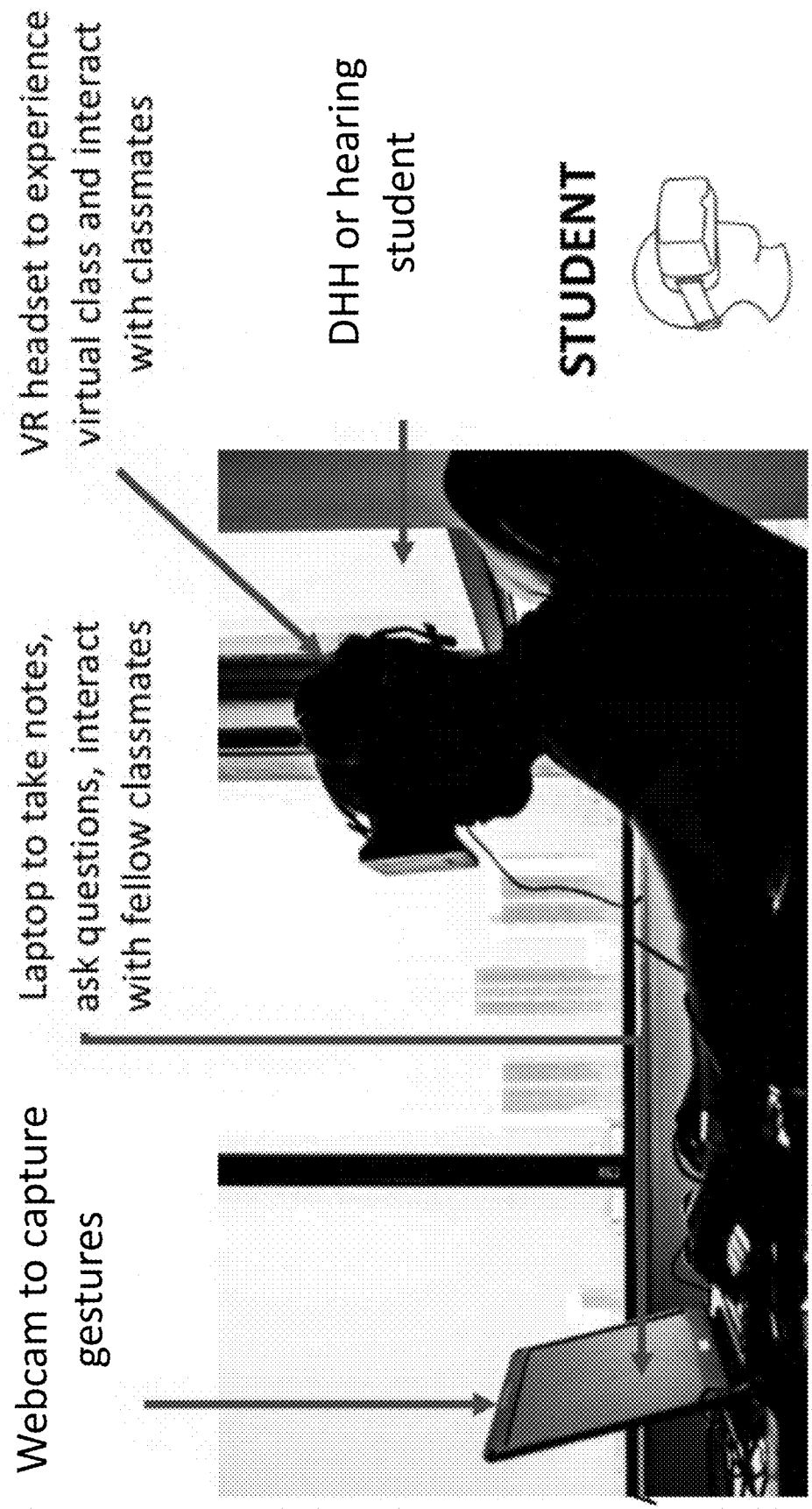
FIG. 5A is an illustration showing a student set-up for use with the system of FIG. 1.
Figure 5B:
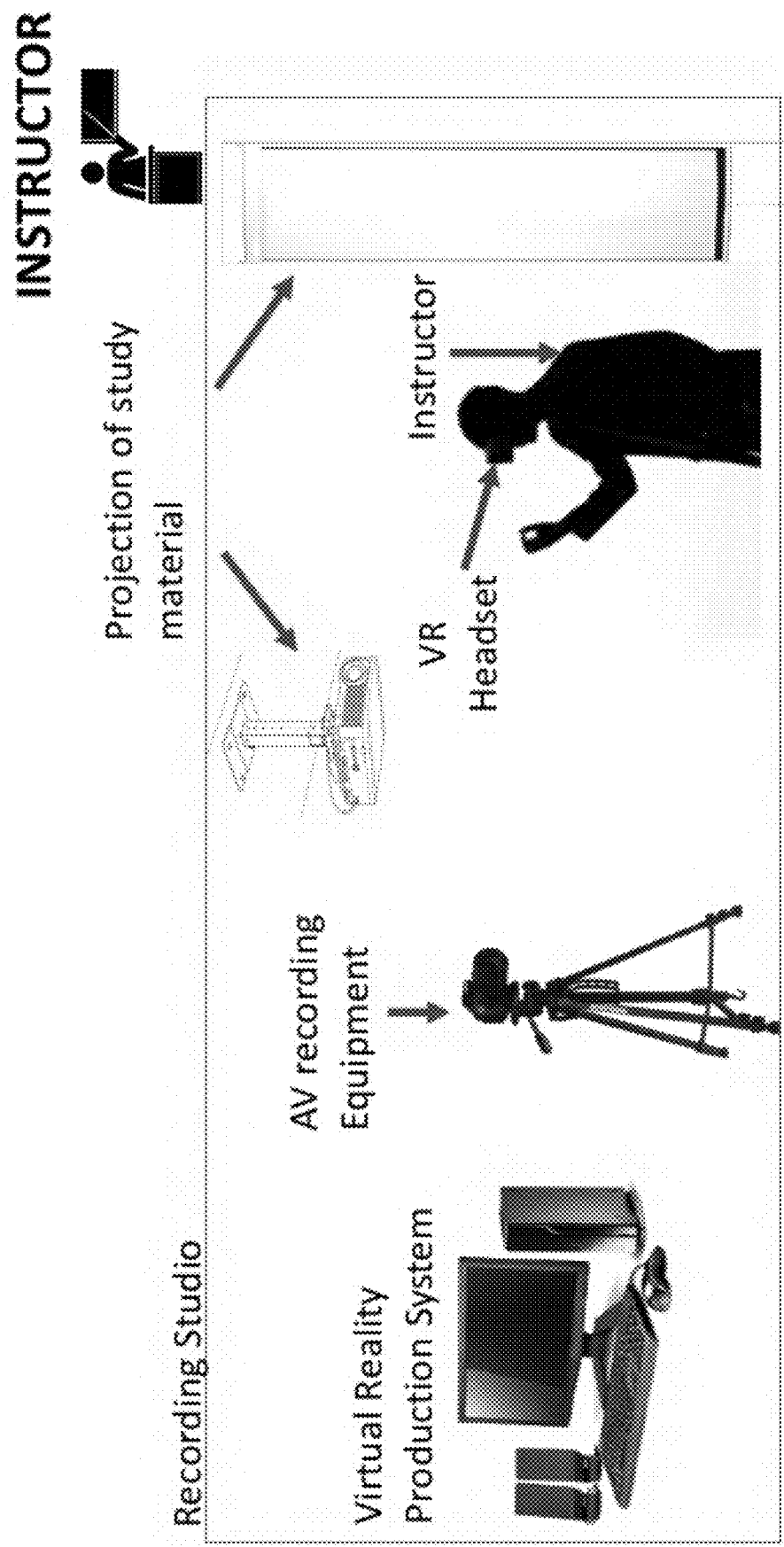
FIG. 5B is an illustration showing an instructor set-up for use with the system of FIG. 1.
Figure 5C:
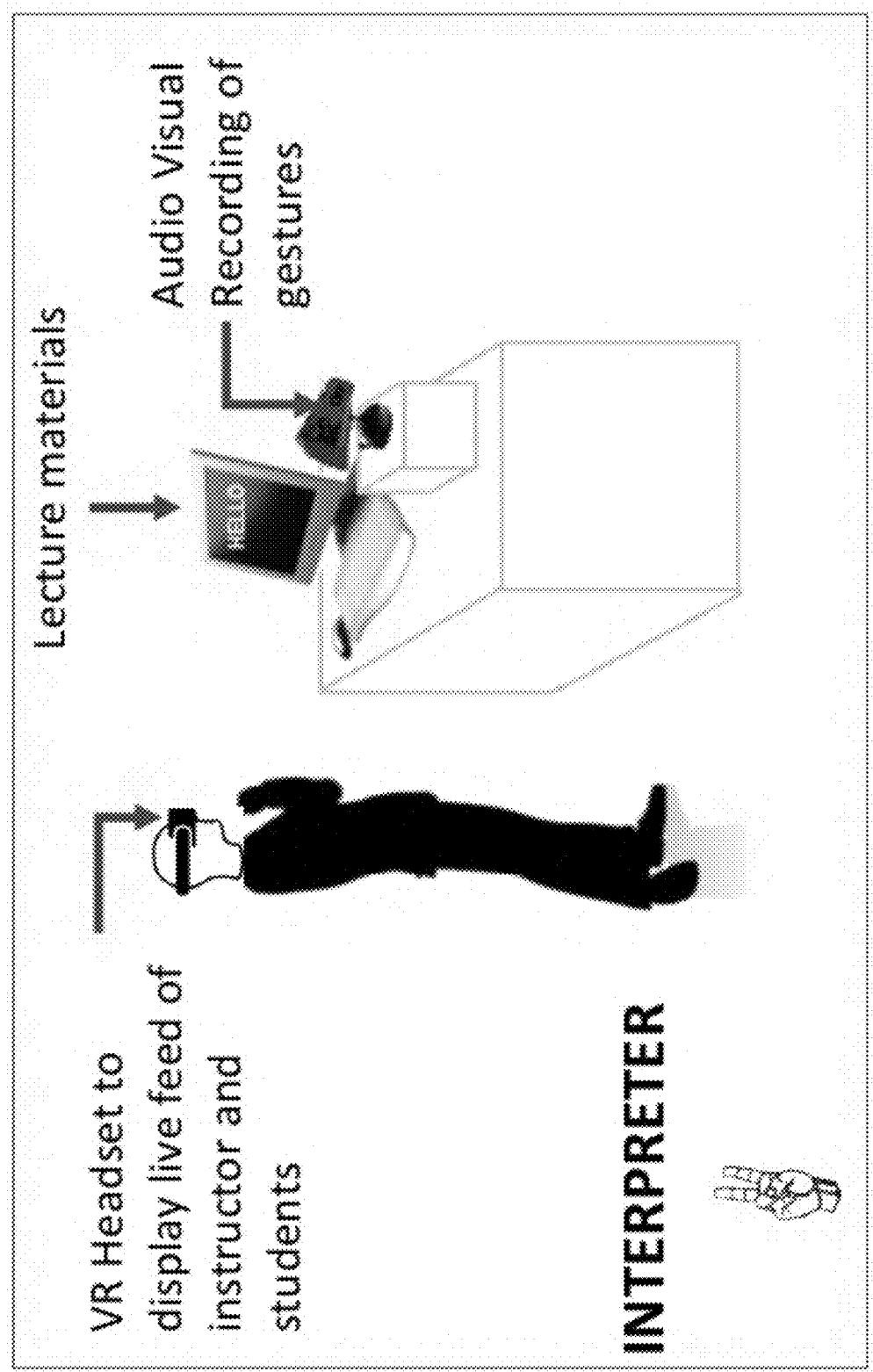
FIG. 5C is an illustration showing an interpreter set-up for use with the system of FIG. 1.
Figure 6:
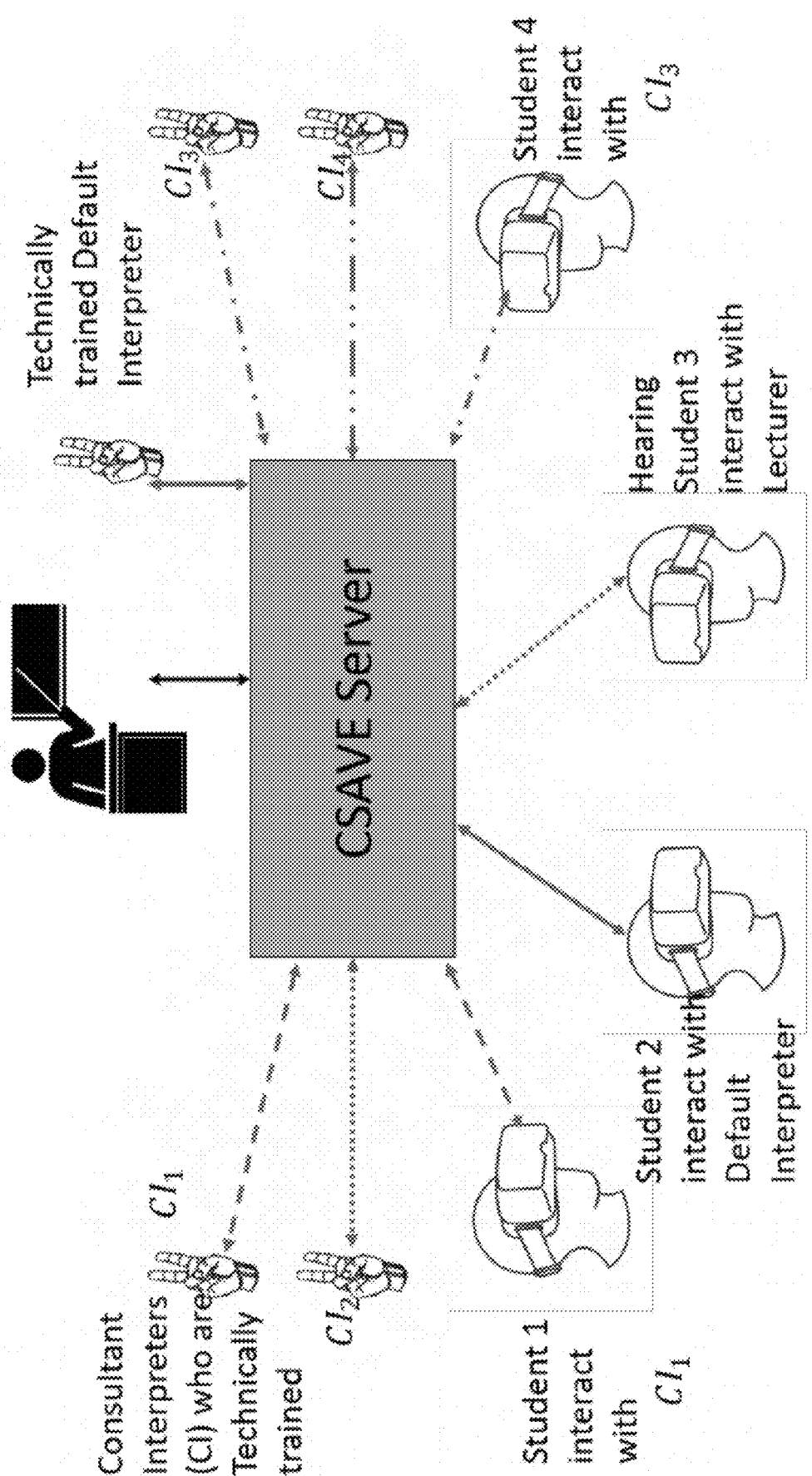
FIG. 6 is a diagram showing an overall architecture for one embodiment of the system of FIG. 1 including a server.
Figure 7A:
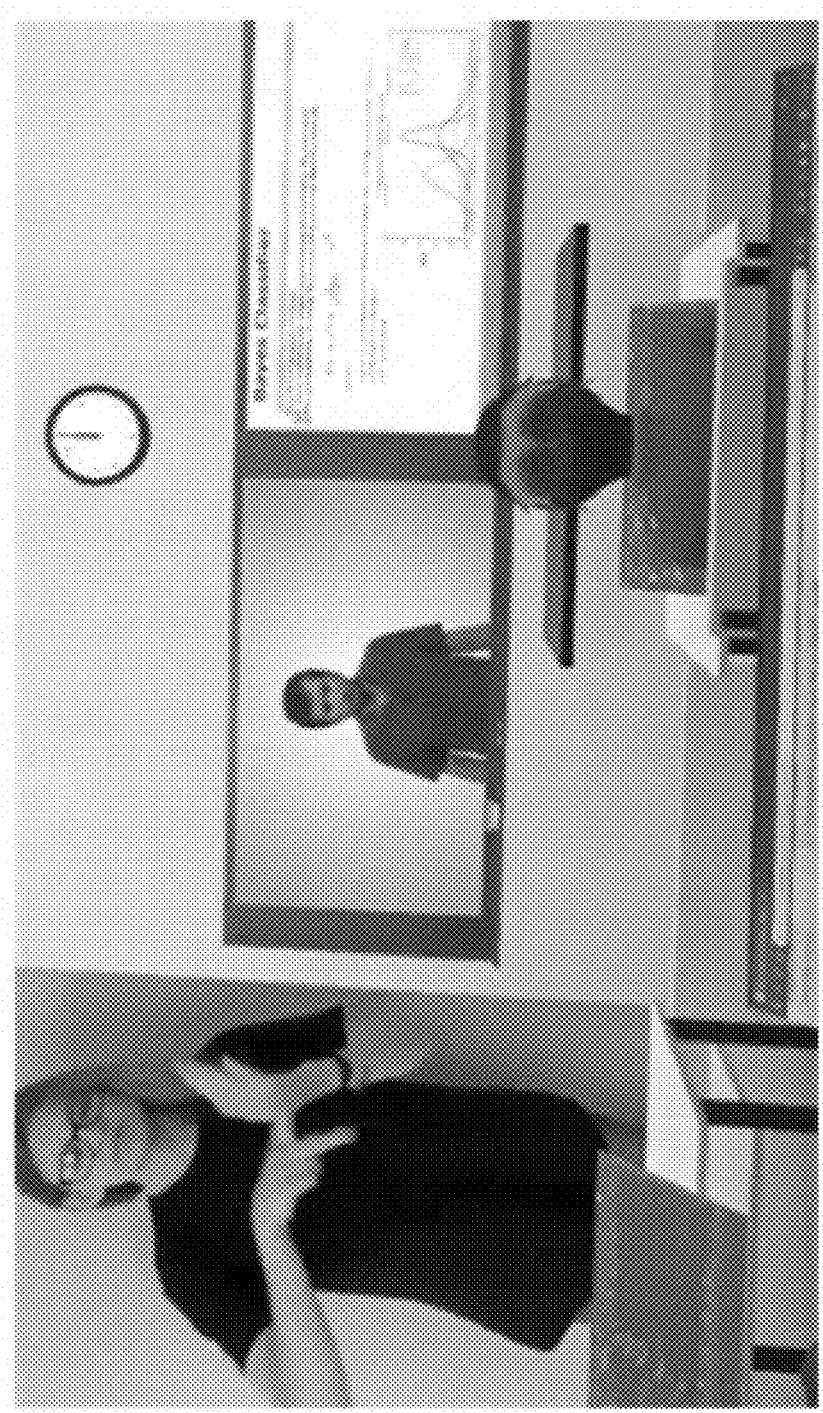
FIGS. 7A-7E are illustrations showing a first VR-enabled user interface of the system of FIG. 1 including an interpreter, a lecturer, lecture slides, in-class collaboration, access to a laptop screen, and remote collaboration.
Figure 7B:
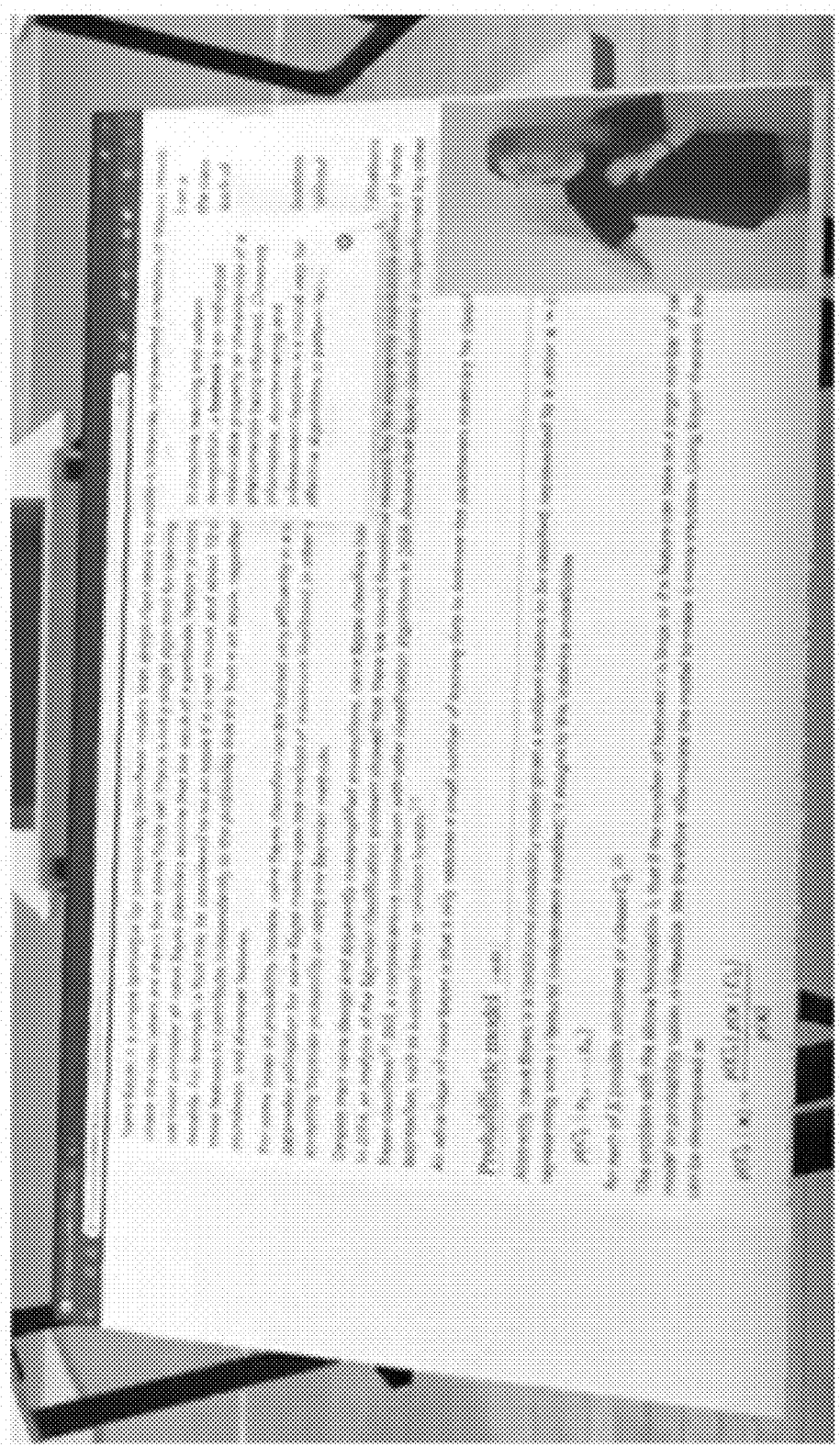
Figure 7C:
Figure 7D:
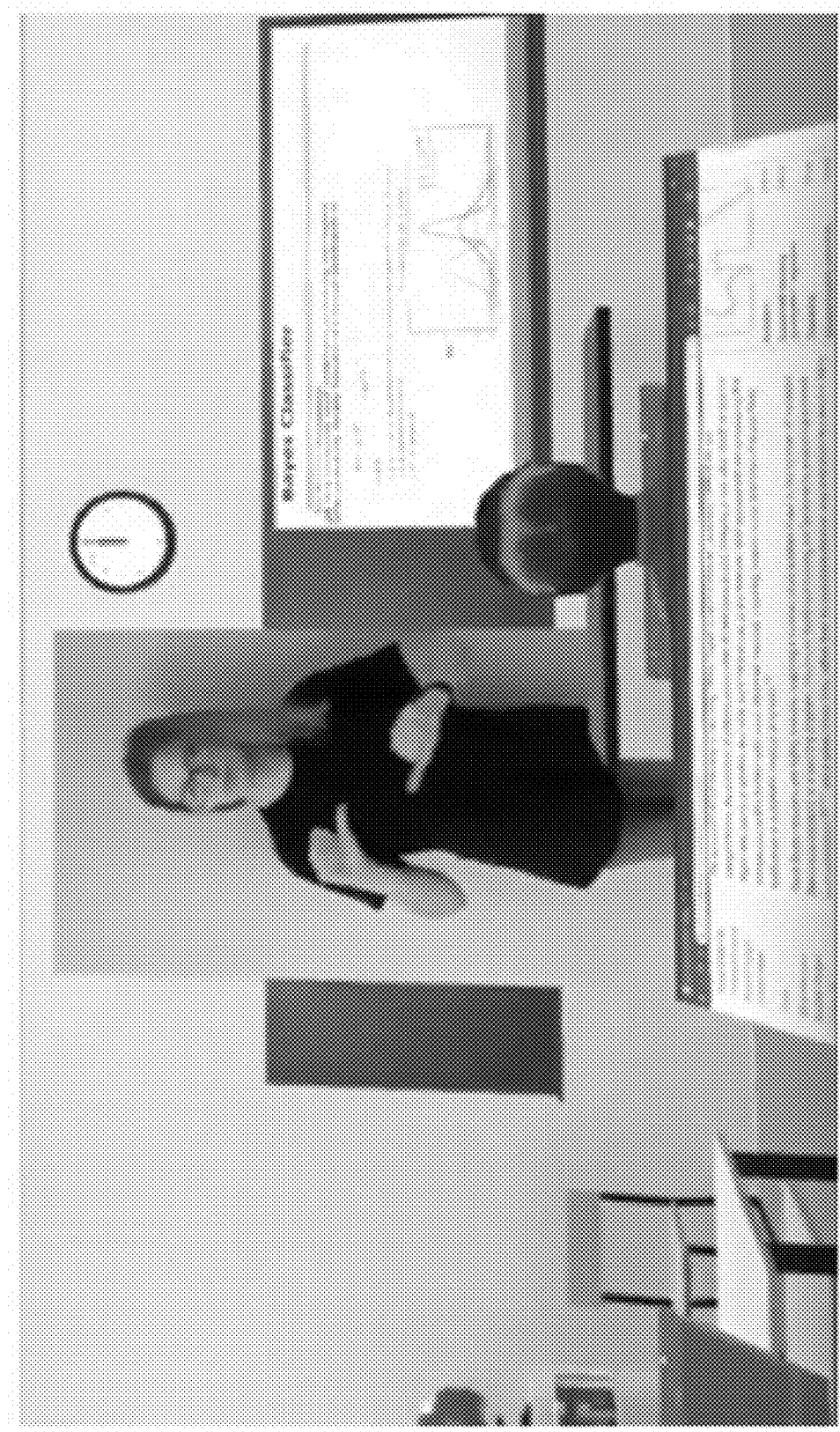
Figure 7E:

FIGS. 1 and 6 show the overall architecture of a CSAVE course. The students, interpreters, and the lecturer are connected to a central CSAVE server. The components needed for different participants in the CSAVE architecture are listed in Table 1. The system 100 will enable both video conferencing and virtual reality options to the students. An example of a student, instructor and interpreter setup is shown in FIGS. 5A-5C. Referring specifically to FIG. 5A, a student may be placed in front of a computer with a webcam or may use a Virtual Reality headset. The webcam may be used to render the video of the student both in the video feed as well as the virtual environment of other students, instructors, and interpreters. The VR headset may be used to provide a virtual in-class experience for the student. On the student's end, the video content may include the video feeds from the virtual classroom with the lecturer, other fellow students, and the optional interpreter.

Referring to FIG. 5B, the Instructor can be present in a recording studio, where the class is delivered live. The instructor can choose to wear a VR headset, which provides an in class experience to the instructor as well. The video feed from the Instructor is rendered in the VR headsets or the video content for the students and the optional interpreter. The Instructors can use their video content or VR headsets to interact with the students and the interpreter. The instructor's voice is streamed live to transcribers or Interpreters who have logged in to the system 100.

In some embodiments of the system 100, the webcam may also be used to capture the gestures performed by the student when it is the turn for the student to interact with the lecturer. A gesture video feed of a DHH student may be accessed by the Interpreter, who may translate the signed communication into English. Each class may have default technically trained interpreters and other consultant interpreters who have different expertise. The interpreter can be chosen by the student. However, if the chosen consultant is not present virtually then the default interpreter video feed may be shown to the student. This can bring a paradigm shift in interpretation services by allowing geographically unconstrained availability for incentive based freelance interpretation service.

The interpreter setup, shown in FIG. 5C, is very similar to the student setup, where the interpreter can use a VR system or the computer to watch the video feed from the instructor and the virtual class. The video feed from the interpreter is rendered to the students and the lecturer through their respective VR devices or computers. Through the video or VR interface, the interpreter continuously translates lecture into signed communication. Whenever a student has a question, the interpreter view is modified to facilitate communication with the specific student. The interpreter can also view the interactions of other students in class and may translate them into sign language for the DHH student. There can be multiple technically trained interpreters that are virtually present at a time.

Through the VR interface the student experiences an immersive classroom. The student is able to view the live lecture and optionally an interpreter of his or her choice. This one way interaction is the most basic operation of the system 100. However, if the student has any question or interjection, then the student can indicate either through an input from the computing system or by simply raising their hand. An automated course monitor then creates a log of such interjections and presents it to the instructor. If the instructor chooses to respond to any interjection and the student needs an interpreter, then the chosen interpreter for the respective student is connected. The student can then ask gesture-based questions (ASL or other sign languages, depending on the students) enhanced with the technical gestures taught to the student and interpreter, and the interpreter can speak out the question for everyone to hear or see.

The instructor view includes a classroom filled with students. The students can choose to display their actual video feed or use an avatar of their choice to represent their presence. VR headsets are able to automatically track the orientation of the head of the wearer. This means that the instructor is not only aware of who is attending the class (their avatar will disappear if they switch applications or take off the headset) but is also subtly aware of who is paying attention by the direction their heads are facing in the classroom. The instructor can also see the default interpreter in his or her view, if applicable.

An important aspect of the system 100 is a group collaboration or interaction functionality. Using this module, a DHH student can perform a face to face meeting with fellow students as well as other DHH students while being accompanied by a virtual interpreter. In addition the DHH student can also join group collaboration activities in separate virtual environments different from the classroom like immersive labs or demonstration rooms. In some embodiments, the gesture matching model 200 of the system 100 can be used to instruct and train interpreters and DHH students on gesture vocabulary for technical terms used in the curriculum. Examples of these applications include computer science, physics, math, biological, chemical and engineering concepts which often do not have common gestures associated with them.

In some embodiments, the system 100 can be used for gesture-based instruction for both hearing and DHH students using the same instructor-student interface and the gesture matching model 200. Students 100 can participate in learning exercises which involve comparing gesture-related tasks with a human tutor using the gesture matching model 200. This functionality can be extended to assessment and instructor training. Examples of these gesture-based tasks include learning sign language, handwashing techniques, and other medical, police or military applications.

Virtual Collaborative Environment to Improve Learning Outcomes for DHH

Collaboration between individuals (both DHH and hearing) is an effective tool to promote learning even in an in class setting. Research has found that collaborative tasks act as an effective tool to exploit the spacing effect that allows for pause in instruction delivery. A carefully incorporated delay in instruction delivery has been found to have better learning outcomes for students. A study conducted on hearing students uncovered several types of collaboration that can materialize between two individuals. The collaboration was facilitated a media system, which was a general purpose orchestration system. Orchestration prefers the teacher's management of a face-to-face classroom workflow that mixes small group, individual and whole class activities. The collaboration was video recorded using three different cameras, one shoulder mounted to the teacher, and two other on tall tripods taking a top view of the student desk.

Collaboration can be of several types including: a) co-construction, where students share thinking and build upon each other's ideas, b) co-operation, where students can simultaneously work on different parts of a problem independently, c) interactive, where both students explain their individual thinking, d) one explaining, where one student explains while the other student agrees or remains silent, e) none explaining, where students make edits in the media system but do not speak or share ideas, f) One student is off task while the other worked, and g) both students are off task. The study found that primarily students were in the "none explaining" collaboration mode. However, a subsequent study discovered that co-construction mode of collaboration has a positive impact on active learning outcomes.

For a collaboration to be categorized as a good collaboration it should have two basic properties: each person's speech or illustrations result in arguments that are constructive towards solving the problem at hand, and there is a balance between the time each person speaks. However, co-construction, co-operation and many other forms of collaboration meet such criteria but may not be beneficial for learning outcomes. In this regard, a significant challenge is to evaluate collaborations with respect to the learning outcomes. In some projects, several formative assessment strategies have been utilized to automatically identify and code types of collaboration. Techniques such as classification, clustering, audio signal processing, and task specific heuristics are used in this regard. Such techniques are explored in the VR environment to detect collaboration and automatically code. The initial learning outcomes due to different types of collaborations will guide instructional development.

Often monitored collaboration is useful to encourage effective interaction between students. This requires the instructor to join the students and monitor their work periodically. The system 100 should enable such capabilities, where a teacher can roam around the classroom or virtual meeting spaces and monitor student progress.

Infrastructure Development

An embodiment of the system 100 may have the following components:

Research Lab: The lab may VR equipment such as Daydream, Occulus Rift, and Go, and wearable sensors such as Myo armbands. The Lab may also be equipped with high resolution video equipment and a small recording studio.

Studio: The studio may be reconfigurable and used to develop VR content and record lecture material for courses as shown in FIGS. 7A-7E.

Hardware configuration: Ten high resolution 360° cameras may be installed in the studio to develop different views in the virtual classroom. Five cameras may be installed on rails on the ceiling such that they can be moved on demand. This may allow reconfiguration of the studio for creation of different virtual environments. The other five may be placed on five desks across the room to create views when the student is on one of those desks. The cameras may be networked through WiFi or wired connections to a central server equipped with Titan V GPU. The cameras may stream high resolution 360° video to the server. The server 140 may be used to synchronize the video and process it such that the video can be rendered to a student's VR headset. The processed video from each camera may be transferred to a virtual reality processing software that may use the live video to render different views of the classroom according to the orientation readings of the VR headset of a given student. The VR video may then be sent to the server 140 which may create separate VR instance for each student, so that each instance may be controlled independently by a student's headset. The studio may be made sound proof, and high resolution recording equipment may be place to record lecture material.

Software configuration: The studio may implement software for parallel streaming of video data from 360° cameras. Video processing tools configured to enhance or compress according to band-width availability at the user end may also be implemented. VR processing software such as Unity may be implemented to convert a live video feed into virtual reality. Finally, parallel processing middleware such as Hadoop may be used to create new instances of the VR content for each student, and control software may be developed to render the appropriate view.

Course development: There may be two primary components of course development: instruction development, which involves preparing lecture material, developing course structure, recording live lectures, and preparing assessment methodologies and extension for the DHH, which involves development of signs for technical terms, training interpreters and transcribers, and students. For the system 100, another important task is to develop course material that encourages collaboration between the DHH peers and in between DHH and Hearing peers.

The mobile applications may be integrated with certification services through which the Interpreters can be accessed for their proficiency. This may result in a pool of Interpreters from which a given DHH student can choose from.

Demonstration Setup

In demonstration, an instance of an online class was set up, where an instructor lectured live about an exemplary AI topic. Examples of topics include introduction to machine learning concepts and other high level topics that do not need mathematical background. The online classroom is setup in Altspace VR and is a virtual environment. The lecturer will remotely log in to the online classroom using the Oculus Rift VR device. There will be at least 2 DHH students logging in using an Oculus Go device. DHH participation will be ensured through collaboration with another event hosted by the authors in AAAI Diversity Activity 2020. For each deaf student a remote interpreter will also log in to the Altspace environment. The remaining 9 Oculus Go devices will be used by hearing participants to log into the class. The hearing participants can either explore the classroom or interact with DHH participants through their interpreters. The disability status of the participants will not be disclosed. This can potentially enable seamless collaboration between the DHH and hearing individuals overcoming the barriers of disabilities. The Altspace online classroom will be hosted on a server at the IMPACT Lab. Sample interfaces for the demonstration is shown in FIGS. 7A-7E.

Prototype and Evaluation of Learning Outcomes

The system 100, in particular, its effectiveness on teaching gesture-based tasks, was evaluated on 100 first-time learners of ASL. Each of subject learned 25 ASL gestures and performed each gesture three times. Videos of the ASL gestures were taken using their own smart-phones at home. The gesture matching model 200 has an overall test accuracy of 87.9% on real-world data. The hybrid dynamical model was evaluated on 60 first-time ASL learners each of them learned 20 ASL gestures and performed three times each gesture. Results show that kinematic parameters in Equation 1 can represent each gesture with precision of 83%, and recall of 80%.

Figures 8A, 8B:
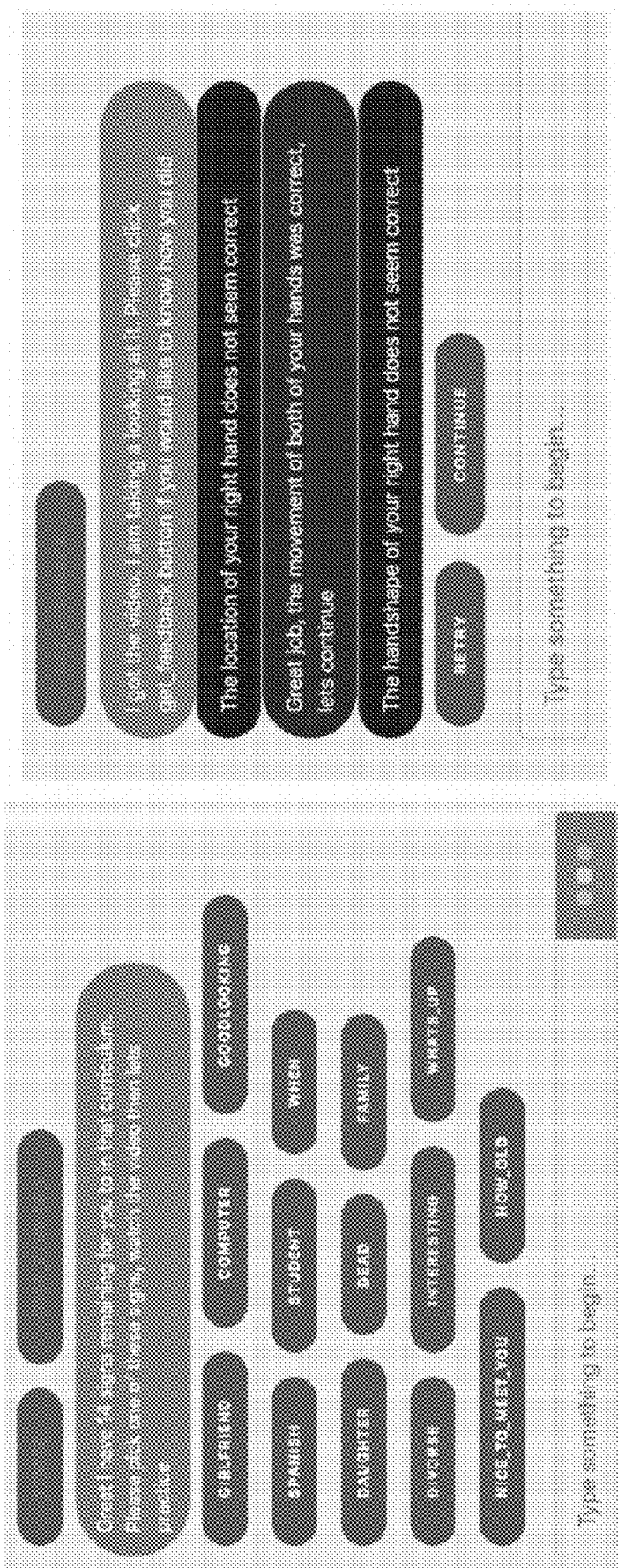
FIGS. 8A and 8B are screenshots showing chat bot conversations using the gesture-matching model of the system of FIG. 1.

A chat bot enabled web based gesture learning interface is developed, as shown in FIGS. 8A and 8B. In this chat bot, the learner chooses a sign and learns the gesture. Then the learner chooses to practice when the video of the learner executing is recorded and compared with the expert. Textual feedback is then provided to the learner to improve gesture execution capability The purpose of assessment tests are to evaluate learning outcomes. Two types of tests are considered: a) retention tests and b) execution tests. 15 subjects were tested on 50 ASL signs of their choice from a pool of ASL signs containing names of each of the United States.

Each learner is given randomly selected signs for retention tests. The learner either chose to practice a given sign multiple times or move on. For each test, the learner is shown a video and is asked to choose among 4 options for the correct one. Thus, the baseline performance for random guessing would be 25%. The performance of the learner with and without feedback is used as a metric for feedback effectiveness.

For execution tests each of the learners is given randomly selected signs to execute. During the test the learner is given a sign and asked to begin recording its execution. The execution tests is manually scored offline by the research team. If the learner had any two of location, movement or handshape correct on both hands, then she receives a score of 0.5 for that sign. If all three were correct, she receives 1. Otherwise, she receives 0. The performance on execution tests with and without feedback is considered to evaluate effectiveness of feedback.

Results show that retention of the signs did not improve with feedback. In fact, retention was already upwards of 80% with or without feedback. However, there was significant improvement in execution accuracy. It improved from 63% without feedback to 85% with feedback. This indicates that overall feedback has a significant effect on learning outcome. The effectiveness of different types of feedback however could not be evaluated given the less number of participants. However, an end of study survey showed that majority of the participants preferred fine grained feedback.

Exemplary Computing System

Figure 9:
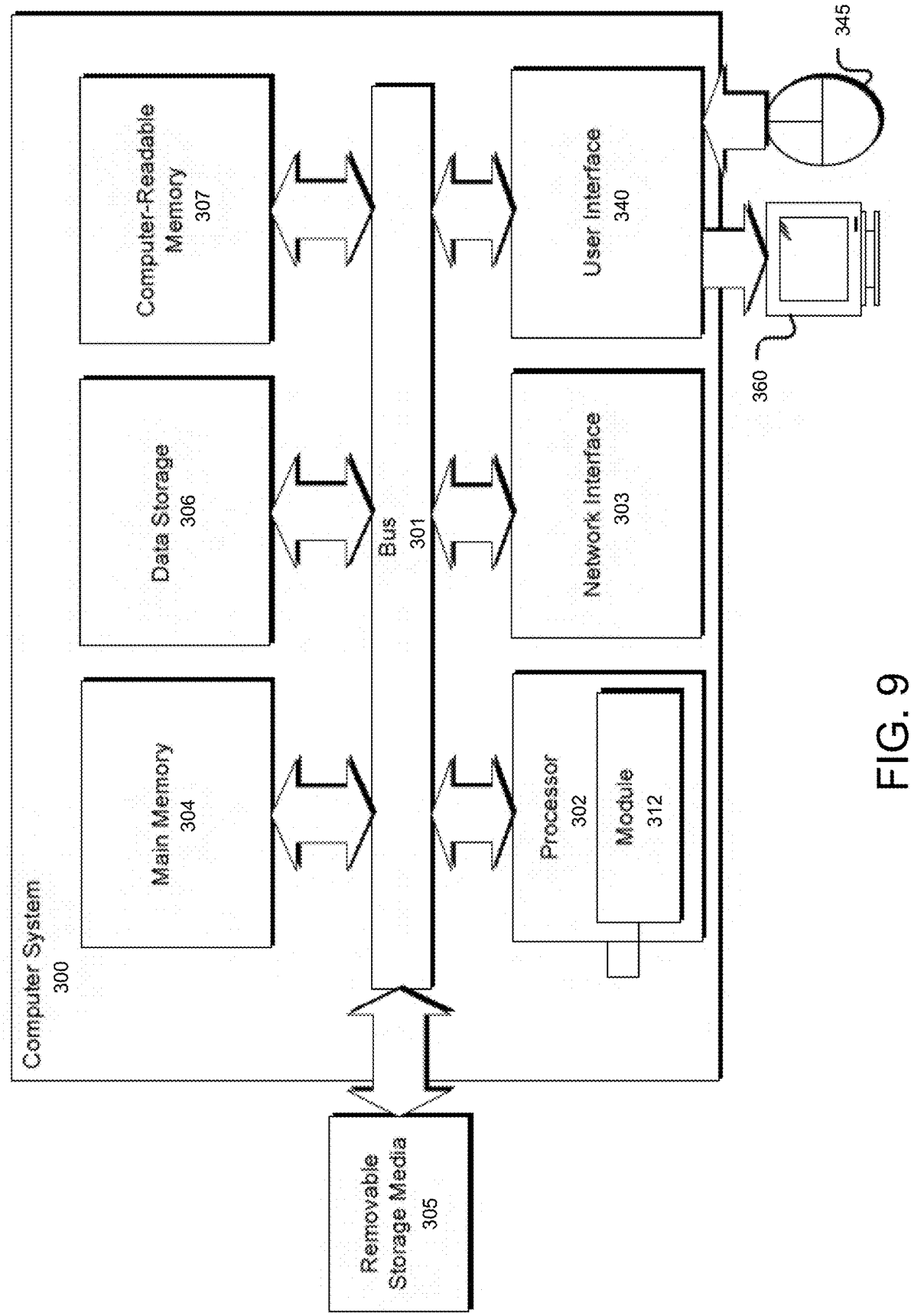
FIG. 9 is an exemplary computing system for use with the system of FIG. 1.

FIG. 9 illustrates an example of a suitable computing system 300 used to implement various aspects of the present system and methods for a research infrastructure for facilitating accessible virtual computer science education. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 312. Such modules 312 are hardware-implemented, and thus include at least one tangible unit capable of performing certain operations and may be configured or arranged in a certain manner. For example, a hardware-implemented module 312 may comprise dedicated circuitry that is permanently configured (e.g., as a special-purpose processor, such as a field-programmable gate array (FPGA) or an application-specific integrated circuit (ASIC)) to perform certain operations. A hardware-implemented module 312 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 312 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 312 are temporarily configured (e.g., programmed), each of the hardware-implemented modules 312 need not be configured or instantiated at any one instance in time. For example, where the hardware-implemented modules 312 comprise a general-purpose processor configured using software, the general-purpose processor may be configured as respective different hardware-implemented modules 312 at different times. Software may accordingly configure a processor 302, for example, to constitute a particular hardware-implemented module at one instance of time and to constitute a different hardware-implemented module 312 at a different instance of time.

Hardware-implemented modules 312 may provide information to, and/or receive information from, other hardware-implemented modules 312. Accordingly, the described hardware-implemented modules 312 may be regarded as being communicatively coupled. Where multiple of such hardware-implemented modules 312 exist contemporaneously, communications may be achieved through signal transmission (e.g., over appropriate circuits and buses) that connect the hardware-implemented modules. In embodiments in which multiple hardware-implemented modules 312 are configured or instantiated at different times, communications between such hardware-implemented modules may be achieved, for example, through the storage and retrieval of information in memory structures to which the multiple hardware-implemented modules 312 have access. For example, one hardware-implemented module 312 may perform an operation, and may store the output of that operation in a memory device to which it is communicatively coupled.

A further hardware-implemented module 312 may then, at a later time, access the memory device to retrieve and process the stored output. Hardware-implemented modules 312 may also initiate communications with input or output devices.

As illustrated, the computing system 300 may be a general purpose computing device, although it is contemplated that the computing system 300 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 302, a main memory 304 (e.g., a system memory), and a system bus 301 that couples various system components of the general purpose computing device to the processor 302. The system bus 301 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 300 may further include a variety of computer-readable media 307 that includes removable/non-removable media and volatile/nonvolatile media, but excludes transitory propagated signals. Computer-readable media 307 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 304 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 302. For example, in one embodiment, data storage 306 holds an operating system, application programs, and other program modules and program data.

Data storage 306 may also include other removable/non-removable, volatile/nonvolatile computer storage media. For example, data storage 306 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 300.

A user may enter commands and information through a user interface 340 or other input devices 345 such as a tablet, electronic digitizer, a microphone, keyboard, and/or pointing device, commonly referred to as mouse, trackball or touch pad. Other input devices 345 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 345 are often connected to the processor 302 through a user interface 340 that is coupled to the system bus 301, but may be connected by other interface and bus structures, such as a parallel port, game port or a universal serial bus (USB). A monitor 360 or other type of display device is also connected to the system bus 301 via user interface 340, such as a video interface. The monitor 360 may also be integrated with a touch-screen panel or the like.

The general purpose computing device 300 may operate in a networked or cloud-computing environment using logical connections of a network interface 303 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 303. In such embodiments, a modem or other means for establishing communications over the network is connected to the system bus 301 via the network interface 303 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method, comprising,
generating an expert reach set for a gesture as performed by a tutor wherein the expert reach set defines correctness for transient movement dynamics and hand shape for the gesture;
receiving a video feed of a user performing the gesture;
converting the gesture as performed by the user into a spatio-temporal evolution of continuous variables by:
generating an X and Y coordinate time series, wherein the positional X and Y coordinate time series is representative of positions of a right wrist and a left wrist of the user; and
extracting a hand shape of the user; and
determining a deviation of the gesture as performed by the user from the expert reach set for the gesture; and
providing correctness feedback to the user based on the deviation of the gesture as performed by the user from the expert reach set for the gesture,
wherein the expert reach set is a set of continuous states observed from simulating a hybrid system representative of the gesture over time for a bounded set of initial conditions
wherein the hybrid system is determined by:
segmenting the gesture as captured by the video feed of the user into a plurality of discrete modes;
clustering each mode of the plurality of discrete modes in accordance with their respective triggering mechanism;
obtaining one or more kinematic equations representative of the gesture by:
processing the gesture data using a multi-variate polynomial regression model or Fisher Information with Cramer Rao bound to obtain a set of flow parameters representative of mode transitions; and
clustering the gesture data using a density based approach to the set of flow parameters for each mode of the plurality of modes; and
deriving guard conditions for each cluster of the gesture.

2. The method of claim 1, wherein the step of generating an expert reach set for a gesture further comprises:
deriving a plurality of initial conditions for the gesture as performed by the tutor by performing a statistical analysis of the tutor's speed, initial positions, and kinematic model parameters; and
performing a reachability analysis using the hybrid system representative of the gesture as performed by the tutor.

3. The method of claim 1, wherein the X and Y coordinate time series is representative of position of the user's wrists over time and wherein the X and Y coordinate time series is extracted using a plurality of location buckets defined around a face and a chest of the user, as captured by the video feed of the user.

4. The method of claim 1, further comprising:
training a neural network having a plurality of layers using gesture hand shapes;
processing the hand shape of the tutor and the hand shape of the user using the neural network; and
comparing respective outputs of a penultimate layer of the plurality of layers using a Euclidean distance metric, wherein each output is representative of the hand shape of the tutor and the hand shape of the user.

* * * * *